United States Patent
Raussi et al.

(10) Patent No.: US 6,208,876 B1
(45) Date of Patent: Mar. 27, 2001

(54) WIRELESS COMMUNICATION DEVICE

(75) Inventors: Juha Raussi, Salo; Kari Lehtinen, Tampere, both of (FI); Peter Karsten, Windsor (GB)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/195,860

(22) Filed: Nov. 19, 1998

(30) Foreign Application Priority Data

Nov. 21, 1997 (FI) ........................................ 974252

(51) Int. Cl.[7] ............................... H04B 1/38; H04M 1/00
(52) U.S. Cl. ............................................ 455/557; 455/550
(58) Field of Search ............................ 455/550, 90, 575, 455/556, 557, 410, 426, 411, 419, 418; 379/442, 447, 110.1

(56) References Cited

U.S. PATENT DOCUMENTS

| | | | |
|---|---|---|---|
| 5,020,090 | * 5/1991 | Morris | 455/557 |
| 5,062,132 | * 10/1991 | Yasuda et al. | 455/557 |
| 5,428,671 | * 6/1995 | Dykes et al. | 455/557 |
| 5,566,226 | * 10/1996 | Mizoguchi et al. | 455/557 |
| 5,805,084 | * 9/1998 | Mannisto | 341/22 |
| 5,812,954 | 9/1998 | Henriksson | 455/550 |
| 5,917,905 | * 6/1999 | Whipple et al. | 379/356 |
| 5,930,703 | * 7/1999 | Cairns | 455/418 |
| 5,940,767 | * 8/1999 | Bourgeois et al. | 455/466 |
| 6,022,156 | * 2/2000 | Blish | 400/472 |
| 6,029,072 | * 2/2000 | Barber | 455/557 |
| 6,041,229 | * 3/2000 | Turner | 455/420 |
| 6,044,153 | * 3/2000 | Kaschke | 379/433 |
| 6,081,730 | * 6/2000 | Lieben et al. | 455/557 |
| 6,125,282 | * 9/2000 | Urabe | 455/552 |
| 6,125,285 | * 9/2000 | Chavez, Jr. et al. | 455/557 |

FOREIGN PATENT DOCUMENTS

| | | |
|---|---|---|
| 0768786 A3 | 4/1997 | (EP) . |
| 2292287 | 2/1996 | (GB) . |
| WO 97/32426 | 9/1997 | (WO) . |

OTHER PUBLICATIONS

Finnish Office Action (and Engligh translation thereof).

* cited by examiner

Primary Examiner—Nay Maung
Assistant Examiner—Joy Redmon
(74) Attorney, Agent, or Firm—Perman & Green, LLP

(57) ABSTRACT

The invention relates to a wireless communication device (1) comprising at least:

a basic unit (2) with at least one keypad or keyboard (6) for using the wireless communication device (1) and controller for locking the keypad (6) of the basic unit, whereby when the keypad (6) of the basic unit is locked, its operation in connection with the wireless communication device (1) is at least partly prevented, an auxiliary unit (3) with at least one keypad or keyboard (15), and link module (11, 17, 58) for connecting the auxiliary unit (3) in a functional connection with the basic unit (2). The wireless communication device (1) comprises further link module and controller (11, 16) for locking the keypad (15) of at least one auxiliary unit arranged in a functional connection with the basic unit (2) simultaneously with locking the keypad (6) of the basic unit, wherein when the keypad (15) of the auxiliary unit is locked, its operation is at least partly prevented. The invention relates also to a method for implementing a keyguard in a wireless communication device (1).

13 Claims, 7 Drawing Sheets

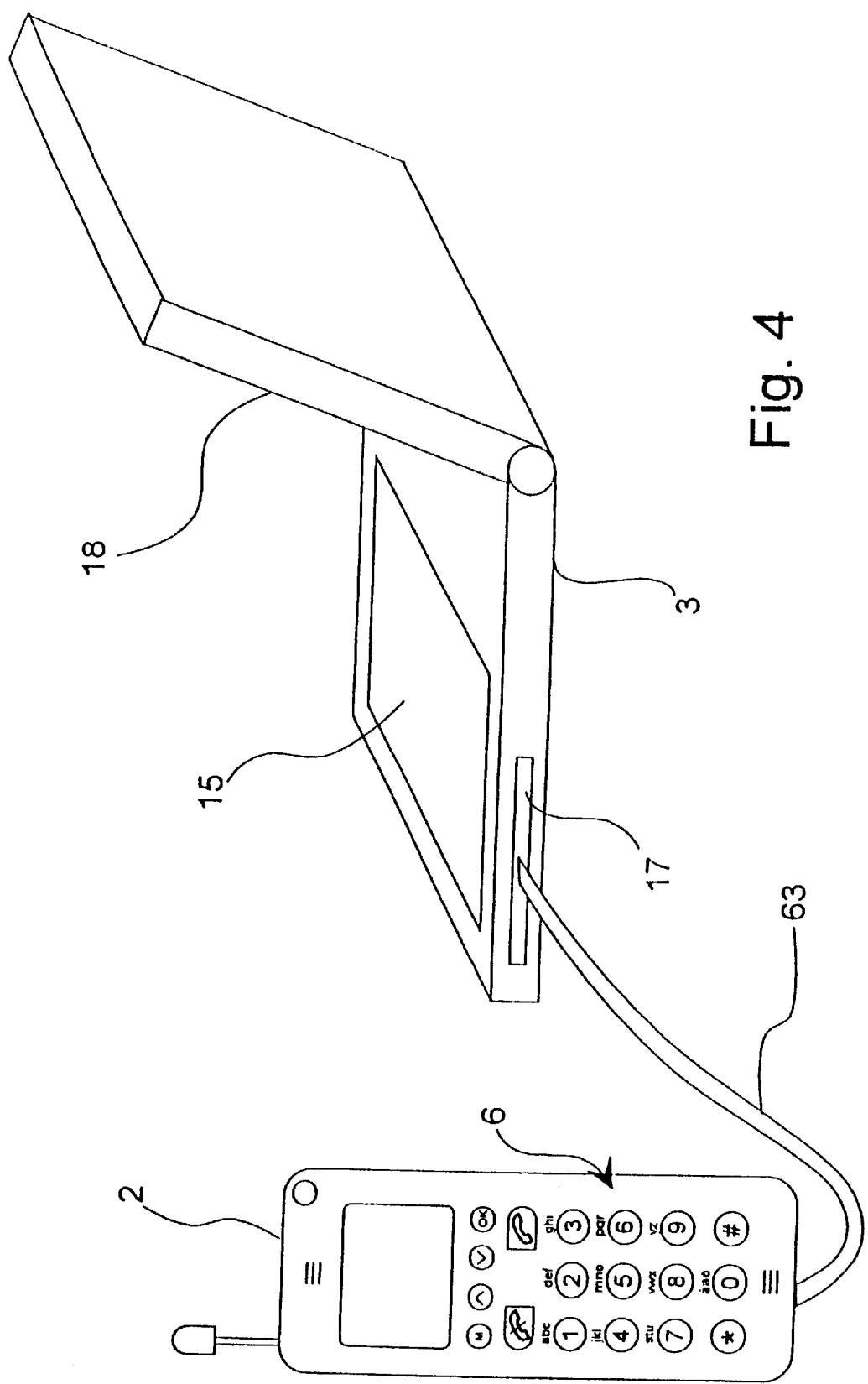

WIRELESS COMMUNICATION DEVICE

FIELD OF INVENTION

The present invention relates to a wireless communication device comprising at least a basic unit having at least one keypad for using the wireless communication device and means for locking and unlocking the basic unit, whereby when the keypad of the basic unit is locked, its operation for using the wireless communication device is at least partially prevented; an auxiliary unit having at least one keypad; and means for connecting the auxiliary unit in an operational connection with the basic unit. The invention relates further to a method for implementing a keyguard in a wireless communication device comprising at least a basic unit having at least one keypad for using the wireless communication device and means for locking and unlocking the basic unit, whereby when the keypad of the basic unit is locked, its operation for using the wireless communication device is at least partially prevented; an auxiliary unit having at least one keypad; and means for connecting the auxiliary unit in an operational connection with the basic unit.

BACKGROUND ART

The keypad of the wireless communication device is used e.g. for dialling a telephone number when setting up a call, for answering an incoming call and for changing the operational settings of the wireless communication device. Many wireless communication devices also offer the option for selecting the last dialled telephone number by pressing one key, such as the handset key. In situations of using wireless communication devices, there is the risk of pressing any key of the keypad unintentionally. As a result of such a situation, the wireless communication device may e.g. set up a call to the telephone number that was last dialled by the user, or the settings of the wireless communication device may be changed. For preventing this, systems have been developed for locking the keyboard of a wireless communication device, whereby the normal operation of the keyboard is prevented. This keyguard is intended for preventing error operations by unintentional pressing of keys.

The keyguard can be implemented for example mechanically, whereby a protective flip or slide for protecting the keypad from unintentional pressing. The keyguard can also be implemented by means of the menu operations of the wireless communication device, whereby the user selects e.g. by a menu key the menu operation, after which the user can flick the menus by scanning keys, such as arrow keys, or select a desired menu operation by the numerical keys. There are also known wireless communication devices in which the keyguard can be selected by pressing the M and * keys. After this, the operation of the keypad is limited so that the wireless communication device will not react to all key pressings. The keyguard can thus be turned off by a predetermined key sequence, such as by pressing the M and * keys in sequence. There is also a known solution in which the keyguard can be turned on by pressing a predetermined key, such as the # key, continuously for a longer time, for example for a couple of seconds, and the keyguard is turned off in a corresponding way by pressing this key continuously for a longer time.

A problems with these wireless communication devices of prior art is, inter alia, the fact that when an auxiliary device with a keypad of its own is connected with the basic unit, the keyguard of the basic unit has no effect on the operation of this keyboard of the auxiliary device. Consequently, operations induced by unintentional pressing of the keypad of the auxiliary unit cannot be prevented by the keyguard of the basic unit.

One such auxiliary unit is an auxiliary battery and a recorder connected to it. The auxiliary unit comprises thus a keypad for controlling the operation of the recorder. Another auxiliary unit to be mentioned in this context is a so-called wristband element comprising at least part of the user interface of the wireless communication device, such as a keypad containing at least the handset keys, a display device, an earpiece and a microphone. A wireless communication device of this kind, equipped with a wristband element, is described in an earlier, still secret patent application by the same applicant.

One purpose of the present invention is to provide a wireless communication device in which the keyguard of the basic unit locks also the keypad of one or more auxiliary units connected to the wireless communication device. The wireless communication device according to the present invention is characterized in that the wireless communication device comprises further means for locking the keypad of at least one auxiliary unit functionally connected to the basic unit simultaneously with locking the keypad of the basic unit, and means for unlocking the keypad of the auxiliary device simultaneously with unlocking the keypad of the basic unit, wherein when the keypad of the auxiliary device is locked, its operation is at least partly prevented. Further, the method according to the present invention is characterized in that the keypad of the auxiliary device is locked in connection with locking the keypad of the basic unit and the keypad of the auxiliary device is unlocked in connection with unlocking the keypad of the basic unit. The invention is based on the idea that when the keypad of the basic unit is locked, the operation of the keypad of the auxiliary unit is prevented either by transmitting information on the keyguard from the basic unit to the auxiliary unit or by ignoring pressing of the keypad of the auxiliary unit in the basic unit.

The invention gives significant advantages to the solutions of prior art. In a wireless communication device according to the invention, it is possible by one keyguard function to lock the keypad of one or more auxiliary devices in addition to the keypad of the basic unit, wherein the effect of unintentional pressing of keys is prevented. Thus, it will not be necessary to provide the auxiliary unit with separate keyguards, such as mechanical covers or the like.

BRIEF DESCRIPTION OF DRAWINGS

In the following, the present invention will be described in more detail with reference to the appended drawings, in which.

DETAILED DESCRIPTION OF PREFERRED EMBODIMENTS

EXAMPLE 1

Figure 1A:
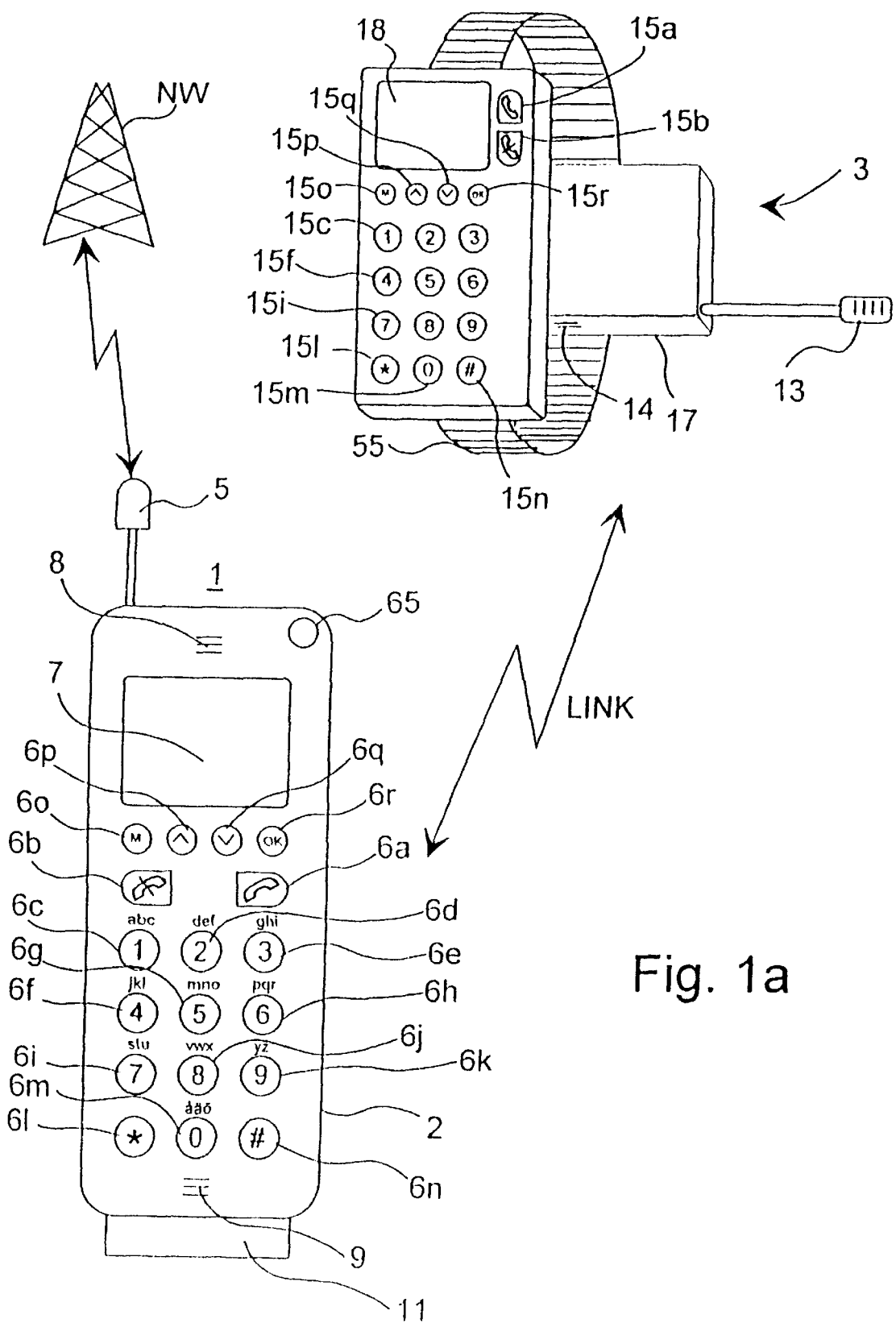
FIG. 1a shows a wireless communication device, in which the invention can be advantageously applied.
Figure 1B:
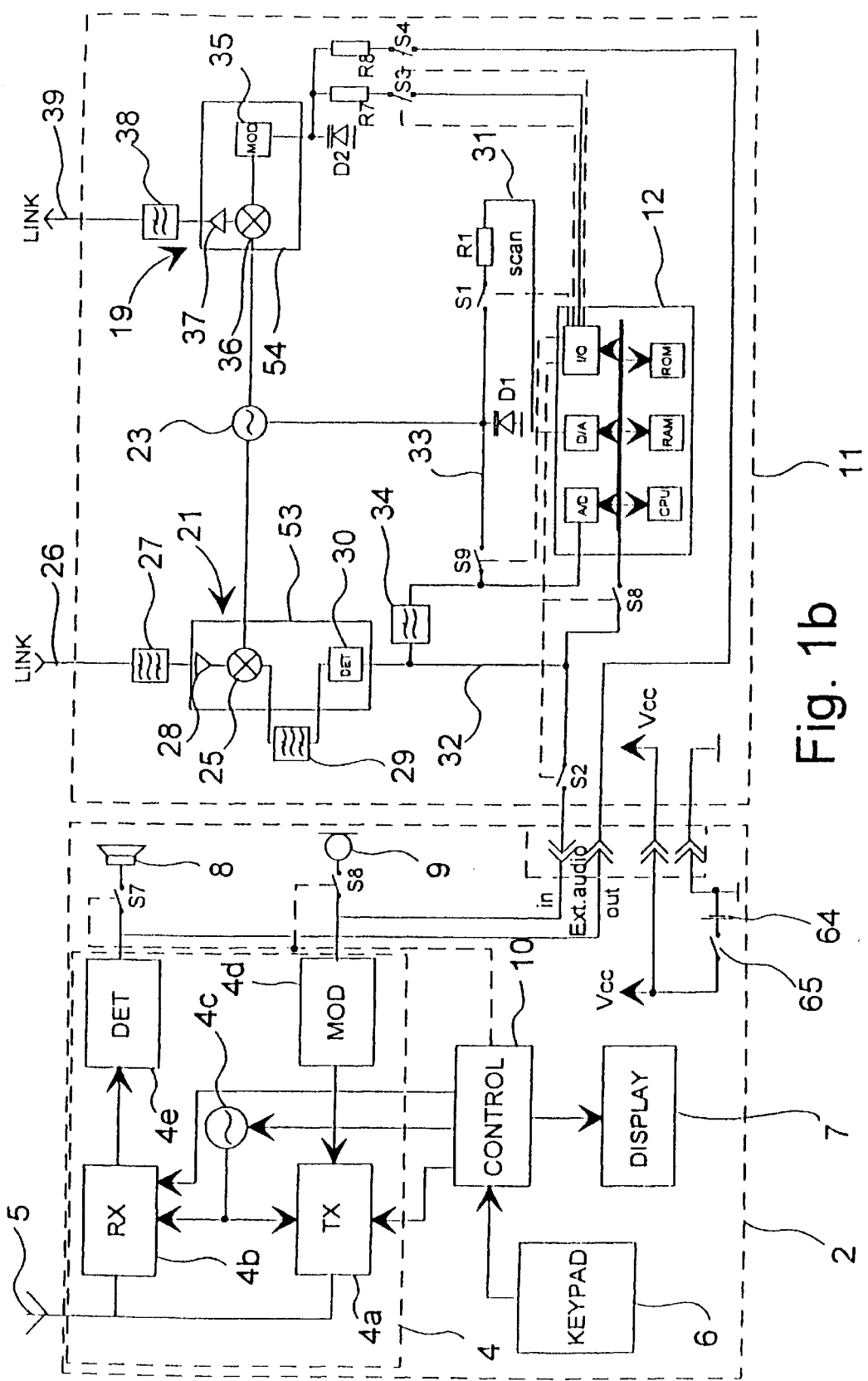
FIG. 1b shows the basic unit of the wireless communication device of FIG. 1a in a reduced block diagram.
Figure 1C:
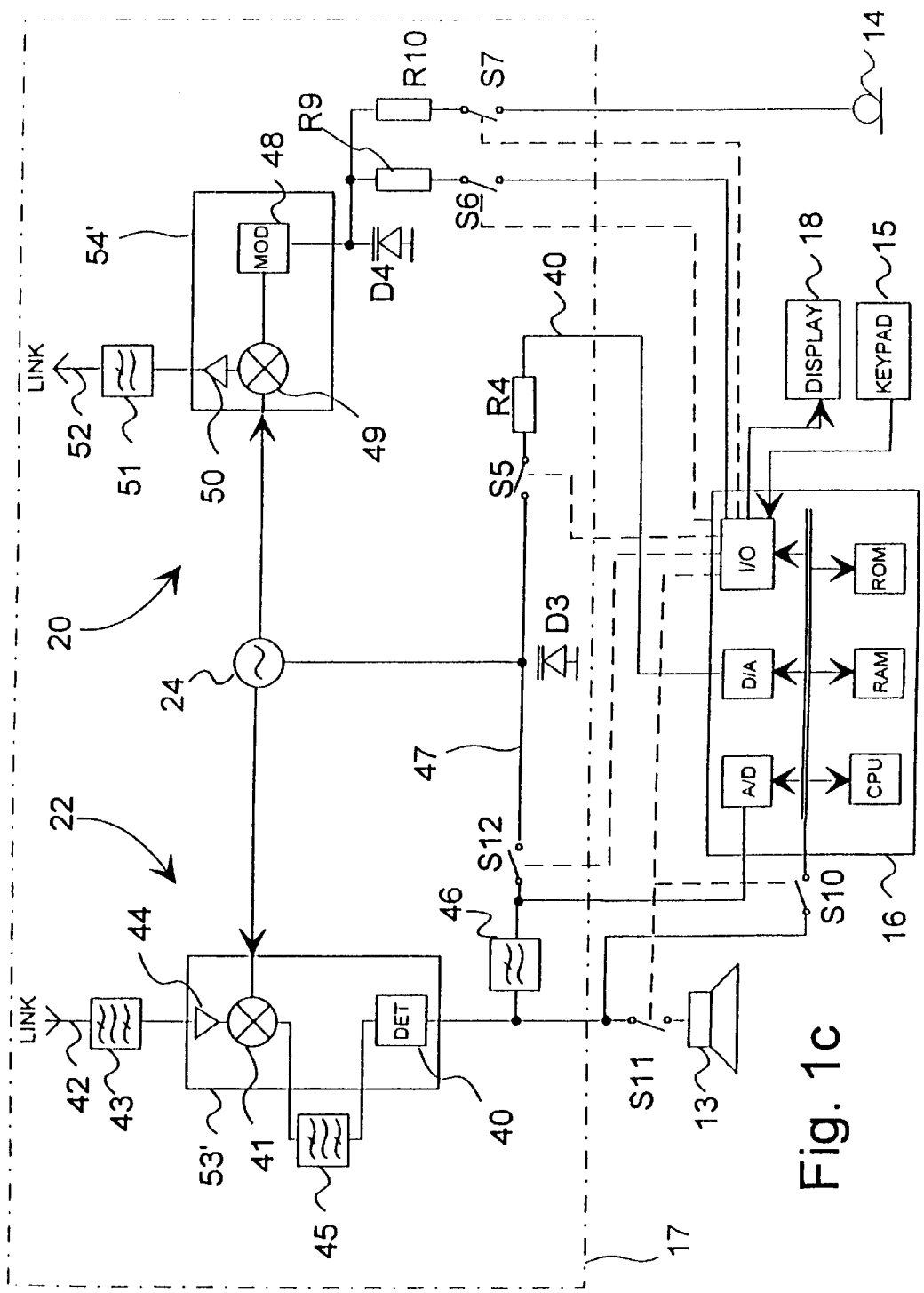
FIG. 1c shows the auxiliary unit of the wireless communication device of FIG. 1a in a reduced block diagram.

The wireless communication device 1 according to the first advantageous embodiment of the invention, as shown in FIG. 1a, consists of a basic unit 2 and an auxiliary unit 3 in a data transmission connection with the basic unit 2. In this example, the basic unit 2 is a mobile station known as such, for example a GSM mobile phone. FIG. 1b is a reduced block diagram on the basic unit 2, and FIG. 1c is a reduced block diagram on the auxiliary unit 3. The basic unit 2 comprises a radio part 4 for a data transmission connection between the wireless communication device 1 and a mobile communication network NW or another wireless communication device (not shown). The radio part 4 comprises e.g. a transmitter 4a, a receiver 4b, a local oscillator 4c, a modulator 4d, and a demodulator 4e for the wireless communication device. The basic unit 2 comprises also an antenna 5 for the radio element, a keypad 6, a display means 7, an earpiece 8 and a microphone 9. Moreover, the basic unit 2 comprises a controller 10 for controlling the operations of the wireless communication device 1 as well as a link module 11 comprising means for setting up a data transmission connection between the auxiliary unit 3 and the basic unit 2. In this embodiment, the link module 11 is provided with a separate controller 12, but the invention can also be applied in a way that at least part of the functions of the link module 11 are arranged in connection with the controller 10 of the basic unit. Further, the reduced block diagram of FIG. 1b shows also a voltage source 64 and an operating switch for the basic unit.

The auxiliary device 3 comprises, in this advantageous embodiment of the invention, e.g. an earpiece 13, a microphone 14, a keypad 15, and a controller 16. The keypad 15 of the auxiliary device comprises for example handset keys 15a, 15b and a set of numerical keys 15c, . . . , 15l. During a call, the user can use the earpiece 13 and microphone 14 of the auxiliary device 3 instead of the earpiece 8 and microphone 9 of the basic unit, wherein the basic unit 2 can be e.g. in the user's pocket. Using the keypad 15 of the auxiliary device, the user can e.g. dial a telephone number and answer an incoming call. The controller 16 controls the operation of the auxiliary unit 3, as will be described below in this description. Further, the auxiliary unit 3 comprises a link module 17 for the data transmission connection between the basic unit 2 and the auxiliary unit 3. In a wireless communication device shown in FIGS. 1a and 1b, the auxiliary unit comprises also a display means 18 for displaying information to the user, for example the telephone number of the telephone from which there is an incoming call.

In this description, the data transmission connection between the basic unit 2 and the auxiliary unit 3 will be called a link connection LINK. For implementing the link connection, several alternatives are available. One solution is to implement the link connection by galvanic means, i.e. by means of wires or a cable.

The link connection can also be implemented as ultrasound data transmission, which is used for example in remote control units for television sets. Thus, the ultrasound transmitter generates an ultrasound signal modulated with the information to be transmitted, and this is demodulated in the ultrasound receiver. By using ultrasound, no visual contact will be necessary between the basic unit 2 and the auxiliary unit 3.

The link connection can also be implemented by using infrared data transmission, whereby both the basic unit 2 and the auxiliary unit 3 comprise an infrared transmitter and receiver. Infrared data transmission requires an unobstructed route for infrared rays of light, either directly or through surfaces reflecting infrared rays of light such as through windows and other glossy surfaces, from the infrared transmitter to the infrared receiver.

One alternative way of forming the link connection is the radio connection. The method of modulation to be used in the link connection is for example the frequency modulation (FM) or a digital modulation method. Advantageously, a frequency range to be used in the link connection is divided into channels, whereby each channel is assigned a certain section of the frequency range. The channel width is influenced e.g. by the method of modulation. For example in frequency modulation, the carrier wave frequency is set into the centre frequency (channel frequency) of the channel, whereby the frequency of the frequency modulated signal is changed according to the modulating signal on both sides of the channel frequency. The maximum frequency deviation is one half of the width of the frequency range assigned for the channel. In this advantageous embodiment of the invention, the link connection LINK is a radio connection, whereby the data is transmitted in modulated radio frequency signals. However, the invention is not limited solely to this embodiment.

The data transmission method to be used in the link connection LINK is not significant in applying the invention as such. The detailed construction of the link module 11 of the basic unit and the link module 17 of the auxiliary unit can vary according to the type of link connection in question. For example in infrared data transmission, the link modules 11, 17 comprise at least an infrared transmitter and receiver and the control circuits required for their control, such as buffering means and modulation/demodulation means (not shown). In a corresponding manner, when using a radio connection, the link modules 11, 17 have a radio transmitter 19, 20 for modulation of the information signal to be transmitted, a radio receiver 21, 22 for demodulation of the received radio frequency signal, and one or several local oscillators 23, 24, as is prior known.

The link connection LINK is advantageously bidirectional preferably so that the link can be used for simultaneous transmission in both directions: from the basic unit 2 to the auxiliary unit 3 and from the auxiliary unit 3 to the basic unit 2. Thus when using the radio connection, the transmitter 19 of the link module of the basic unit transmits on the free channel frequency of the first transmission band (uplink band), and the transmitter 20 of the link module of the auxiliary unit transmits on the corresponding channel frequency of the first receiving band (downlink band). In practical applications, the difference between the frequencies of the transmission and reception channels is set constant (duplex range). Thus, the link module can be implemented advantageously so that the transmitter 19, 20 and the receiver 21, 22 have a joint local oscillator 23, 24, whereby e.g. when the receiver 21, 22 is being tuned on a desired channel frequency, the transmitter 19 is tuned at a distance of the duplex range.

The wireless communication device 1 according to the first advantageous embodiment of the invention operates in the following way. By means of the menu functions (not shown) of the wireless communication device 1, the wireless communication device 1 is set in a user air interface (UAI) mode, whereby the auxiliary unit 3 is in use. When there is an incoming call to the wireless communication device 1 or information to be transmitted between the basic unit 2 and the auxiliary unit 3, a link connection LINK is formed between the basic unit 2 and the auxiliary unit 3. In this embodiment the link connection LINK is implemented as a radio connection, whose operation will be described below in this description.

The controller 16 of the auxiliary unit examines, advantageously at determined intervals or on the basis of an interruption request, which key 15a, 15b, ..., 15r is possibly pressed. In this embodiment, on the basis of pressing a key, the controller 16 of the auxiliary unit transmits a message on this key pressing via the link connection LINK to the basic unit 2. Advantageously, the controller 10 of the basic unit conducts the actual interpretation of the key pressing. Thus, the application software of the basic unit controller 10 comprises definitions on the functions indicated by each key pressing. For example, numerical keys are usually used for entering telephone numbers and possibly also for writing letters. The handset key 15a (FIG. 1a) is used for starting call set-up or for answering an incoming call. This handset key is ordinarily marked with a green handset.

The locking of the keypad 15 of the auxiliary unit 3 operates in this advantageous embodiment of the invention in the following way. The user selects the keyguard e.g. from the menu functions of the basic unit 2 of the wireless communication device for example by pressing a keypad menu key 6o and the * key 6l, whereby the keypad of the basic unit 2 is locked. In this situation, the keypad of the basic unit 2 can normally be used only for answering an incoming call and for unlocking the keyguard. During a call, it is possible to release the keyguard of the basic unit 2 and possibly also of the auxiliary unit 3, if necessary, either entirely or partially.

The keyguard information is in this advantageous embodiment transmitted also to the auxiliary unit 3. The basic unit 2 starts setting up an link connection LINK between the basic unit 2 and the auxiliary unit 3, as will be disclosed below in this description. After setting up the link connection LINK, the link module controller 12 generates a keyguard command, which is e.g. a certain bit string. The command is transmitted to the link module controller 12 for generating the message to be transmitted via the link connection to the auxiliary unit 13. For transmission, it is possible to use data transmission methods known as such, for example data transmission in frame form inter alia for eliminating possible transmission errors. The message to be transmitted in the link module and thus containing at least the command to be transmitted, is modulated by a link module modulator 31. The receiver of the auxiliary unit receives the transmitted message which is led to the controller 16 of the auxiliary unit.

The controller 16 of the auxiliary unit examines the information transmitted in the message received, i.e. in this case the keyguard command. Following this, the keyguard information is turned on in the application software of the controller 16 of the auxiliary unit, and preferably also in the controller 10 of the basic unit. The keyguard information can be e.g. a certain bit in the random access memory (RAM) range of the controller 10, 16. The bit value is e.g. the logical 1 state when the keyguard is on and, in a corresponding way, the logical 0 state when the keyguard is off. This is prior art to an expert in the field, whereby a more detailed discussion on the implementation of the keyguard information will not be necessary in this context.

In case a complete keyguard is desired for the keypad 15 of the auxiliary unit, it is advantageously implemented so that the controller 16 of the auxiliary unit will not examine the keypad 15 in the keyguard state, or in a way that the controller 16 of the auxiliary unit will not conduct the functions determined for the keys pressed. A complete keyguard is applicable for use particularly in such wireless communication devices 1 in which the information on pressing keys of the keypad 15 of the auxiliary unit is not transmitted to the basic unit 2 but the keypad 15 of the auxiliary unit is intended primarily for controlling the function of the auxiliary unit 3. An example of this kind of an application is an auxiliary battery 59 shown in FIG. 3, with a recorder arranged in connection with the auxiliary battery 59.

The keyguard can also be implemented in a way that the unlocking of the keyguard is allowed also by using the keypad 15 of the auxiliary unit. Thus, it is advantageous to implement the keyguard of the auxiliary unit in a way that the controller 16 of the auxiliary unit examines the pressings of keys of the keypad 15 of the auxiliary in a normal manner but information on this will be transmitted to the controller 10 of the basic unit only in a case when the user has pressed the keyguard unlocking key(s). This is an advantageous embodiment in applications where the keypad 15 of the auxiliary unit is used at least partly in parallel with the keypad of the basic unit For example in a wireless communication device according to FIGS. 1a to 1c, the auxiliary unit 3 arranged in connection with a wrist band 55 comprises a keypad 15 including handset keys 15a, 15b, numerical keys 15c, ..., 15l, and special keys 15m, ..., 15r.

In the following, the turning off of the keyguard will be described in a situation when the locking of the keypad 15 of the auxiliary unit can be released only via the keypad 6 of the basic unit. Thus, the user releases the keyguard via the keypad of the basic unit by using a predetermined key sequence, for example the M key 6o and the * key 6l. Following this, the keyguard information is converted in the application software of the controller 4 of the basic unit into a state informing that the keyguard is off. The controller 4 of the basic unit transmits a command for releasing the keyguard of the keypad 15 of the auxiliary unit to the link module. The controller 12 of the link module starts setting up a link connection LINK between the basic unit 2 and the auxiliary unit 3, if the link connection LINK is not on. The link module transmits a message containing a command to release the keyguard. The received command is interpreted in the application software of the controller 16 of the auxiliary unit, and the keyguard information is interpreted in the application software of the controller 16 of the auxiliary unit, and the keyguard information is converted into a state informing that the keyguard is off. After this, both the keypad 6 of the basic unit and the keypad 15 of the auxiliary unit operate normally.

In some embodiments, the keyguard can be arranged to be released also via the keypad 15 of the auxiliary unit. Thus, for releasing the keyguard, the use presses a predetermined key sequence of the keypad 15 of the auxiliary unit, for example the M key 15o and the * key 15l of the auxiliary unit. The controller 16 of the auxiliary unit conducts examining of the keypad 15 of the auxiliary unit in a way described above in this description, and examines the key sequence. After detecting that the key sequence is the release of the keyguard, the controller 16 converts the keyguard information in a state informing that the keyguard is off. Further, the controller 16 of the auxiliary unit starts setting up the link connection LINK between the basic unit 2 and the auxiliary unit 3, if the link connection LINK is not on at the time. After setting up the link connection, a message containing the command to release the keyguard is sent from the auxiliary unit 3 to the basic unit 2. In the application software of the controller 10 of the basic unit, the received command is interpreted, and also the keyguard information is converted into a state informing that the keyguard is off, whereby the keypads 6, 15 operate normally.

Moreover, the keyguard can be implemented in a way that the basic unit 2 will ignore key commands from the auxiliary unit. Thus, the keyguard information does not need to be transmitted to the auxiliary unit 3 but the keyguard information is set advantageously in the application software of the controller 10 of the basic unit. On the basis of this information, the controller 10 of the basic unit will not examine the key information from the auxiliary unit 3 when the keyguard is on. This embodiment is applicable for wireless communication devices 1 in which the keypad 15 of the auxiliary unit is not used directly for controlling the operations of the auxiliary unit 3. For example, the keypad 15 of the auxiliary unit is parallel to the keypad 6 of the basic unit, but in a way that the release of the keyguard is arranged to be conducted only via the keypad 6 of the basic unit.

KEYPAD EXAMPLE

Figure 2:
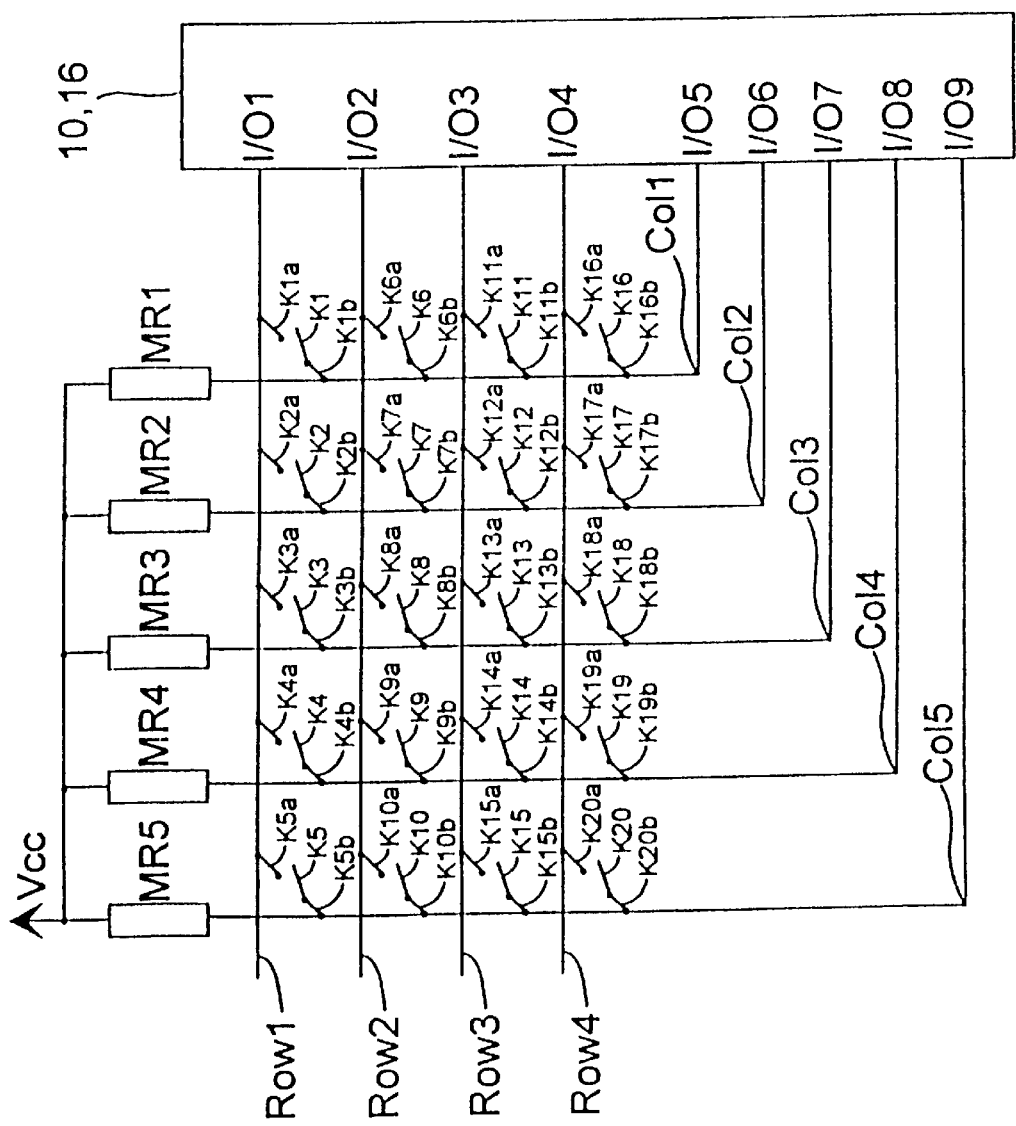
FIG. 2 illustrates a keyboard implementation in a reduced block diagram.

FIG. 2 is a reduced block diagram showing a solution of prior art for implementing the keypad 6, 15. The keypad is implemented e.g. in a matrix form consisting of column lines and row lines (conductors), whereby the switch for each key is coupled in an electroconductive connection with one column line and one row line. Thus, a separate connection line will not be required for each key. The key matrix of FIG. 2 comprises four row lines Row1, . . . , Row4 and five column lines Col1, . . . , Col5, whereby it is possible to implement a keypad 6, 15 consisting of a maximum of 20 keys. The number of row lines Row1, . . . , Row4 and/or column lines Col1, . . . , Col 5 can be changed according to how many keys are needed in the keypad. Each key comprises a key switch K1, . . . , K20, which in the released condition is advantageously open, i.e. in the non-conductive state and is closed upon pressing the key. The first connection line K1a, K2a, . . . , K20a of each switch K1, . . . , K20 is connected to one row line Row1, . . . , Row4, and in a corresponding manner, the second connection line K1b, K2b, . . . , K20b is connected to one column line Col1, . . . , Col5. The key matrix of FIG. 2 is arranged directly in connection with the controller 10, 16 in a way that each row line Row1, . . . , Ro24 and column line Col1, . . . , Col5 is connected to the binary connection line I/O1, . . . , I/O9 of the controller 10, 16. The binary connection line can be an input line, an output line, or it can be a combined input and output line. In the application software of the controller 10, 16, it is possible to read the logical state of the input lines and, in a corresponding manner, to set the state of the output lines either in the logical 0 state or the logical 1 state. In this embodiment, the connection lines I/O1, . . . , I/O4 coupled to the row lines Row1, . . . , Row4 are defined as output lines, and they are preferably of the open collector type. The connection lines I/O5, . . . , I/O9 coupled to the column lines Col1, . . . , Col5, respectively, are defined as input lines. Furthermore, the column lines Col1, . . . , Col5 are coupled by pull-up resistances MR1, . . . , MR5 advantageously to a supply voltage Vcc with a value of e.g. approximately 3 V or 5 V.

The keypad 6, 15 is read e.g. in a way that the controller 10, 16 first sets the first connection line I/O1 coupled to the first row line Row1 in the logical 0 state, whereby the voltage of the first row line Row1 is set close to 0 V. Thus, in a case that no key arranged in connection with the first row line Row1 is set, i.e. all the key switches K1, . . . , K5 are open, the pull-up resistances MR1, . . . , MR5 keep the voltage of all column lines Col1, . . . , Col5 close to the supply voltage Vcc. However, if any of the keys coupled on the first row line Row1 is pressed, the corresponding key switch K1, . . . , K5 is closed, whereby it couples the first row line Row1 to the column line Col1, . . . , Col5 coupled to this key switch. As a result, the voltage of this column line Col1, . . . , Col5 is substantially equal to the voltage of the first row line Row1, i.e. close to 0 V, which in this embodiment indicates the logical 0 state. The voltage of the other column lines remains close to the supply voltage Vcc, i.e. in the logical 1 state.

The logical state (0/1) of the column lines Col1, . . . , Col5 can be found out by determining the number of connection lines I/O5, . . . , I/O9 coupled to the column lines Col1, . . . , Col5 in the application software of the controller 10, 16. As a result, a binary digit $b_5 b_6 b_7 b_8 b_9$ is obtained, in which $b_5$ indicates the logical state of the fifth connection line I/O5 or the first column line Col1, $b_6$ indicates the logical state of the sixth connection line I/O6 or the second column line Col2, $b_7$ indicates the logical state of the seventh connection line I/O7 or the third column line Col3, $b_8$ indicates the logical state of the eighth connection line I/O8 or the fourth column line Col4, and $b_9$ indicates the logical state of the ninth connection line I/O9 or the fifth column line Col5. If the first key switch K1 is being pressed, the result is the binary digit 01111. In a corresponding manner, pressing down the second key switch K2 gives the binary digit 10111, pressing the third key switch K3 gives the binary digit 11011, pressing the fourth key switch K4 gives the binary digit 11101, and pressing the fifth key switch K5 gives the binary digit 11110.

Next, the controller 10, 16 sets the state of the first connection line I/O1 coupled to the first row line Row1 back to the logical 1 state, and the state of the second connection line I/O2 coupled to the second row line Row2 to the logical 0 state, whereby it is possible to find out the state of the key switches K6, . . . , K10 coupled to the second row line Row2 by reading the state of the connection lines I/O5, . . . , I/O9 coupled to the column lines Col1, . . . , Col5, as described above. In a corresponding manner, the state of the key switches K11, . . . , K15 of the third row can be found out by setting the third connection line in the logical 0 state, and the state of the key switches K16, . . . , K20 of the fourth row can be found out by setting the fourth connection line I/O4 in the logical 0 state.

The application software of the controller 10, 16 contains information stored on which connection line is set in the 0 state at each the time of reading, whereby on the basis of this information and the above-mentioned binary digit $b_5 b_6 b_7 b_9$ it is possible to find out in the application software of the controller 10, 16 whether there are keys being pressed and in the positive case, which key is in question.

Only one alternative of applying the keypad 6, 15 is described above, but the present invention can also be applied in connection with other types of keypads. It should also be mentioned that the appearance of the keypad and the grouping of the keys are not necessarily influenced by the way of electrical implementation of the keypad. For example, in the matrix form described above, the appearance of the keypad does not need to be the same 4×5 matrix form. Furthermore, the keypad 6, 15 does not need to contain all the key switches K1, . . . , K20 of the matrix. For example in the embodiment shown in FIGS. 1b and 1c, the keypads 6, 15 contain 18 keys 6a, . . . , 6r; 15a, . . . , 15r.

Moreover, it is possible to implement the keypad 6, 15 by using a keypad control circuit designed for this purpose (not shown). Thus, the keypad control circuit conducts examining of the keypad, storing of the key code advantageously in its random access memory or the like, and transmits e.g. an interruption request to the controller 16 if any of the keys is being pressed. The code of the pressed key can be found out by reading the random access memory of the keypad controller circuit.

SETTING UP A LINK CONNECTION

The following is a description of setting up a link connection LINK in a wireless communication device I according to the first advantageous embodiment of the invention as shown in FIGS. 1a to 1c.

The receiver 21 of the link module 11 of the basic unit is directed to sweep through the receiving band selected for the link connection LINK for finding a free channel e.g. by switching a triangle waveform voltage in a frequency control line 31 and turning on the switch S1. The triangle wave is generated e.g. by the digital-to-analog converter (D/A) of the controller 12 of the link module. The triangle wave is led through a switch S1 and a resistance R1 to a capacitance diode D1. A change of voltage between the conductors of the capacitance diode D1 induces a change in the capacitance of the capacitance diode D1. The capacitance diode D1 is coupled to the frequency control circuit of a local oscillator 23 of the link module, whereby the frequency of the local oscillator 23 of the link module is changed in relation to the change in the voltage of a frequency control line 31. The frequency generated by the local oscillator 23 of the link module is led to the mixer of the receiver of the link module. Also coupled to the mixer, a link reception antenna circuit comprises a link module receiving antenna 26, a first band-pass filter 27, and a high-frequency amplifier for the receiver of the link module. As the pass band for the first band-pass filter 27 is set the frequency range of the receiving band selected for the first link connection, whereby radio-frequency signals in this frequency range are transmitted to a mixer. The output of the mixer 25 gives the mixing result which is the difference between the local oscillator frequency and the radio-frequency signal to be received, and this is conveyed through a second band-pass filter 29 to a detector 30. The width of the pass band of the second band-pass filter 29 is substantially equal to the width of the channel, whereby the signals possibly on the adjacent channels do not disturb demodulation. The output 32 of the detector gives the demodulated signal. The demodulated signal is led also to a low pass filter 34, and the low-pass filtered signal is led to an AFC line 33 whose voltage level is monitored during sweeping by the controller 12 of the link module. In the device of FIG. 1b, this takes place in the analog-to-digital converter (D/A) of the controller 12 by converting the voltage value into a digital value to be processed in the application software of the controller 12. The voltage level of the AFC line is proportional to the DC level of the output of the detector 30. Upon reception of the signal transmitted from the auxiliary unit 3, the AFC line 33 can be used for keeping the local oscillator frequency of the receiver locked in the carrier frequency of the transmitted signal.

On the basis of the voltage level of the AFC line 33, the controller 12 deduces whether there is other traffic on the reception band to be examined. If there is no other traffic, tuning is possible on any channel frequency of the reception band. If there is other traffic, a free channel must be selected from the reception band. If there is no free space available, it will not be possible to set up a connection to the auxiliary unit 3 on the selected reception band. If a free space is available, the receiver is tuned on this channel frequency, i.e. a control voltage corresponding to the selected channel frequency is set on the capacitance diode D1. Thus the capacitance of the capacitance diode D1 sets the frequency of the local oscillator 23 of the link module to correspond to the selected channel frequency. Simultaneously with tuning the receiver of the link module on the correct channel frequency, also the transmitter of the link module is tuned at a distance of the duplex range, because in this embodiment the local oscillator 23 of the link module is common both for the receiver 21 of the link module and the transmitter 19 of the link module.

The demodulated signal is received from the output line 32 of the detector of the link module. Upon reception of a data signal, the controller 12 turns on a switch S8, whereby the data signal to be received is led to the controller 12 of the link module for examining the data received. An audio signal, however, is led to the basic unit 2 by turning on a switch S2. Upon reception of a transmission from the auxiliary unit 3, it is possible to couple the AFC line 33 on the capacitance diode D1 by turning on a switch S9, whereby the receiver 21 is locked onto the frequency of the emission.

After finding a free reception channel, it is possible to begin setting up a data transmission connection between the basic unit 2 and the auxiliary unit 3. The controller 12 of the link module switches on the transmitter 19 of the link module, turns on a switch S3, and advantageously enters a password on the data input of the modulator of the link module, the password being common to the link module 11 and the auxiliary unit 3.

The transmitter 19 of the link module shown in FIG. 1b operates in the following way. The modulating signal is led to a capacitance diode D2 whose capacitance is changed according to the modulating signal. The data signal is passed through the switch S3 and a separation means R7, and the analog signal through a switch S4 and a separation means R8. The separation means R7, R8 are primarily used as impedance adapting means. The basic frequency of the oscillator 35 to be modulated is selected so that a frequency difference of the desired duplex range is formed between the radio-frequency signal to be transmitted and the radio-frequency signal to be received. By using a common local oscillator, it is possible to tune both the receiver and the transmitter so that the duplex range remains constant, irrespective of the channel used. As a result of the modulation, a frequency modulated signal is generated, which is passed to the first input of the mixer 36 of the transmitter of the link module. To the second input of the mixer 36 is passed the frequency of the local oscillator 23 of the link module, being set so that the receiver is tuned on the desired receiving frequency. The output of the mixer gives thus a modulated signal with the frequency of the transmission signal, which is further amplified in the high-frequency amplifier 37 of the transmitter of the link module and low-pass filtered in a low-pass filter 38 e.g. for damping spurious emissions. From the low-pass filter, the modulated radio-frequency signal is passed to the transmission antenna 39 of the link module.

The receiver of the auxiliary unit is turned on at certain intervals, for example every five seconds, and the receiving band of the auxiliary band, i.e. the transmission band of the link module 11, is scanned. Simultaneously, the controller 16 of the auxiliary unit monitors the output of the detector 40 of the auxiliary unit to find out if there are emissions possibly generated by the link module of the basic unit on the band. In the positive case, the receiver is locked to the emission and the information contained in the emission is read. If the information contains the password of the auxiliary unit, the receiver of the auxiliary unit is locked to this frequency.

The purpose of this continual turning on is to reduce power consumption of the auxiliary unit 3. It is only during a call and upon transmission of information from the basic unit 2 to the auxiliary unit 3 that there is a need to keep the supply voltages constantly turned on in the auxiliary unit 3. At other times, the supply voltages can be turned off, by checking only at certain intervals if the basic unit 2 has received a call or if the basic unit is transmitting information to the auxiliary unit 3.

The receiver 21 of the link module of the basic unit can operate in a similar power-saving way, i.e. it monitors only intermittently if there are emissions on its receiving band, i.e. on the transmission band of the auxiliary unit; at other times, the supply voltages are turned off.

Supply voltages to the transmitter elements in the link module 11 of both the auxiliary unit and the basic unit are turned on preferably only during a call and during transmission of information.

The operation of the transceiver of the auxiliary unit 3 is in its essential parts similar to the operation of the transceiver of the link module. The receiver 22 of the auxiliary unit is set to scan through the transmission band selected for the first link connection e.g. by switching a triangle waveform voltage in a frequency control line 40 and turning on the switch S5. The triangle wave is led through the switch S5 and a resistance R4 to the capacitance diode D3. Using the capacitance diode D3, the frequency of the local oscillator 24 is adjusted in relation to the change in the voltage of the frequency control line 40. The frequency generated by the local oscillator 24 of the auxiliary unit is led to the mixer 41 of the receiver of the auxiliary unit. The radio-frequency signals received from the receiving antenna 42 of the auxiliary unit are passed through a third band-pass filter 43 to be amplified in a high-frequency amplifier 44 of the receiver of the auxiliary unit, and to the mixer 41 of the receiver of the auxiliary unit. From the output of the mixer 41, the difference signal of the local oscillator frequency and the radio-frequency signal to be received is led through a fourth band-pass filter 45 to the detector 40 of the auxiliary unit. The width of the pass band of also the fourth band-pass filter 45 is substantially equal to the width of the channel. The output signal of the detector 40 is led to the low-pass filter 46 of the detector of the auxiliary unit for generating an AFC signal. The demodulated signal is given from the audio line of the auxiliary unit. Upon receiving a data signal, the signal is passed to the controller 16 of the auxiliary unit by turning on the switch S10 which examines the received data. Instead, the audio signal is led to the earpiece 13 of the auxiliary unit by turning on the switch S11. Further, the demodulated signal is conveyed further through a resistance R6 to the AFC line 47, whose voltage level is monitored by the controller 16 of the auxiliary unit. Locking on the frequency of the emission is advantageously conducted by switching the voltage of the AFC line 47 to the capacitance diode D3 of the local oscillator of the auxiliary unit by turning on the switch S12.

In the transmitter 20 of the auxiliary unit, the data or audio signal to be modulated is transmitted to a capacitance diode D4 which is in the oscillator circuit of the modulator 48 and whose basic frequency is selected so that a frequency difference of the desired duplex range is formed between the radio-frequency signal to be transmitted and the radio-frequency signal to be received. The controller 16 turns on the switch S6 for the time of the data transmission, whereby the switch S7 is in the open position. In a corresponding manner, the controller 16 turns on the switch S7 and opens the switch S6 for the time of transmission of an analog signal. Separation means R9, R10, coupled in series with the switches S6, S7, are used as adapting means. The modulation results in a frequency-modulated signal which is led to the first input of the mixer 49 of the transmitter. The frequency of the local oscillator 24 of the auxiliary unit is led to the second input of the mixer 49. Thus, the output of the mixer gives a frequency-modulated signal with the frequency of the transmission channel, which is further amplified in the high-frequency amplifier 50 of the auxiliary unit and low-pass filtered in a low-pass filter 51 e.g. for damping spurious emissions. From the low-pass filter, the modulated radio-frequency signal is led to the transmission antenna 52 of the auxiliary unit.

Although the link module 11 is shown in the appended drawings 1a and 1b as a separate module to be connected to the basic unit 2, it is also possible to integrate the functions of the link module 11 in the basic unit 2.

In practical solutions of the receivers 21, 22 of the link module and of the auxiliary unit, it is possible to use e.g. intermediate frequency (IF) circuits 53, 53' used in analog wireless communication devices, including a mixer, high-frequency and low-frequency amplifiers, a limiter, and a detector. The sensitivity of the circuits is sufficient for this purpose. The circuits are inexpensive, and their power consumption is low. Also for the implementation of the transmitter 19, 20, there are FM modulators 54, 54' available.

For the controllers 10, 12, 16, it is possible to use e.g. microcontrollers, known as such, having besides a processor also a random access memory (RAM), input and output (I/O) lines, an analog-to-digital (A/D) converter, a digital-to-analog (D/A) converter, as well as a read only memory (ROM). Particularly in applications, in which the link module 11 is integrated in the basic unit 2, it is possible to implement the functions of the controller of the link module at least partly also in the application software of the controller of the basic unit 2.

The switches S1, . . . , S12 are advantageously semiconductor switches, whereby the control of the switches is conducted by turning on a voltage in the switch control line, the switch being in the off position at a first voltage value and in the on position at a second voltage value. The first voltage value is e.g. about 0 V and the second voltage value is a value close to the supply voltage $V_{cc}$. Thus, the control line can be coupled to the binary input/output (I/O) line of the controller 12, 16, at which the said two voltage values can be set by the application software of the controller.

The link module 11 is fixed advantageously to the system connector 12 of the basic unit 2 or the like, through which the signalling required in the data transmission connection between the link module 11 and the basic unit 2 can be arranged.

EXAMPLE 2

Figure 3A:
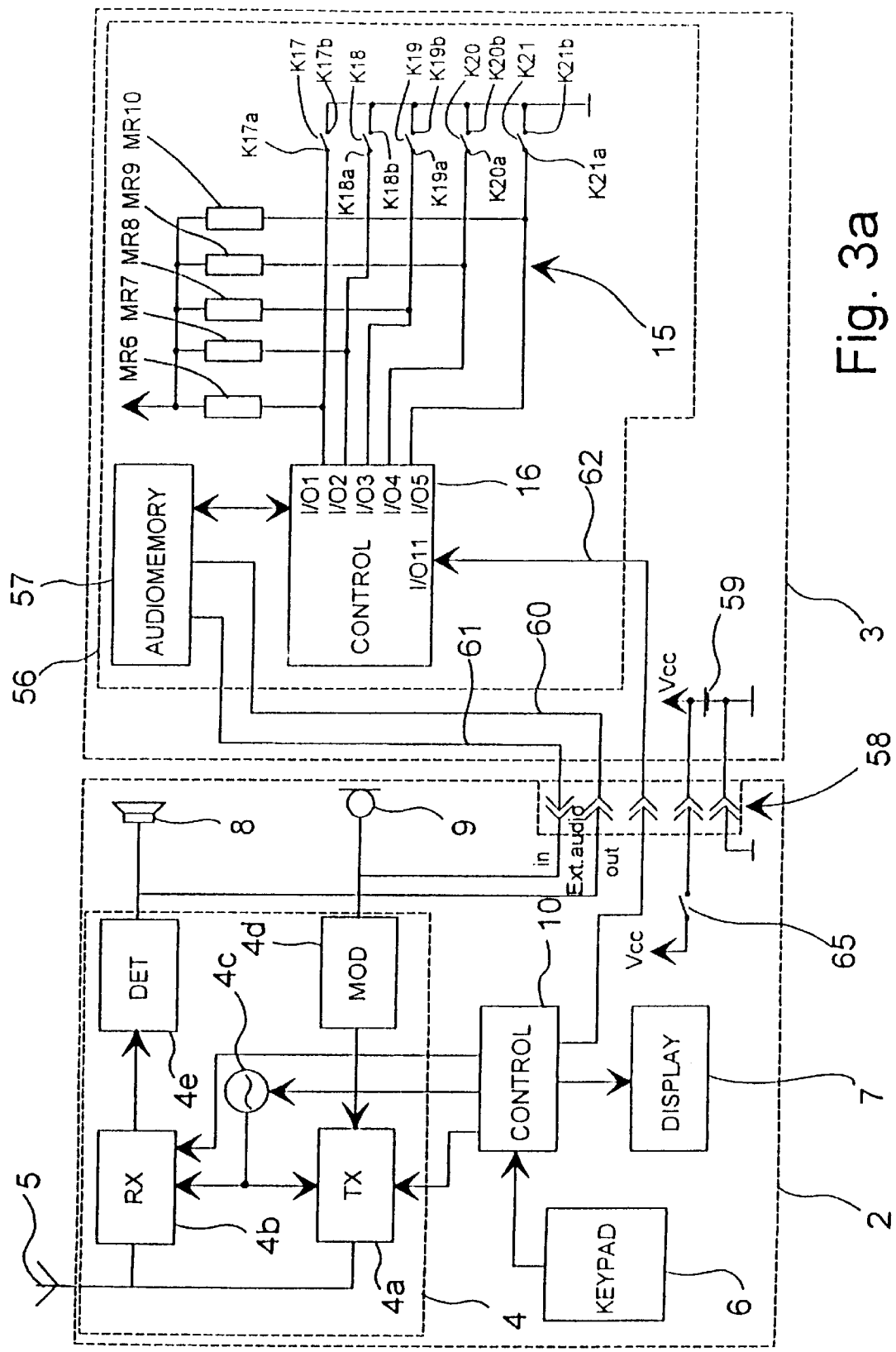
FIG. 3a is a reduced block diagram showing another wireless communication device in which the invention can be advantageously applied.
Figure 3B:
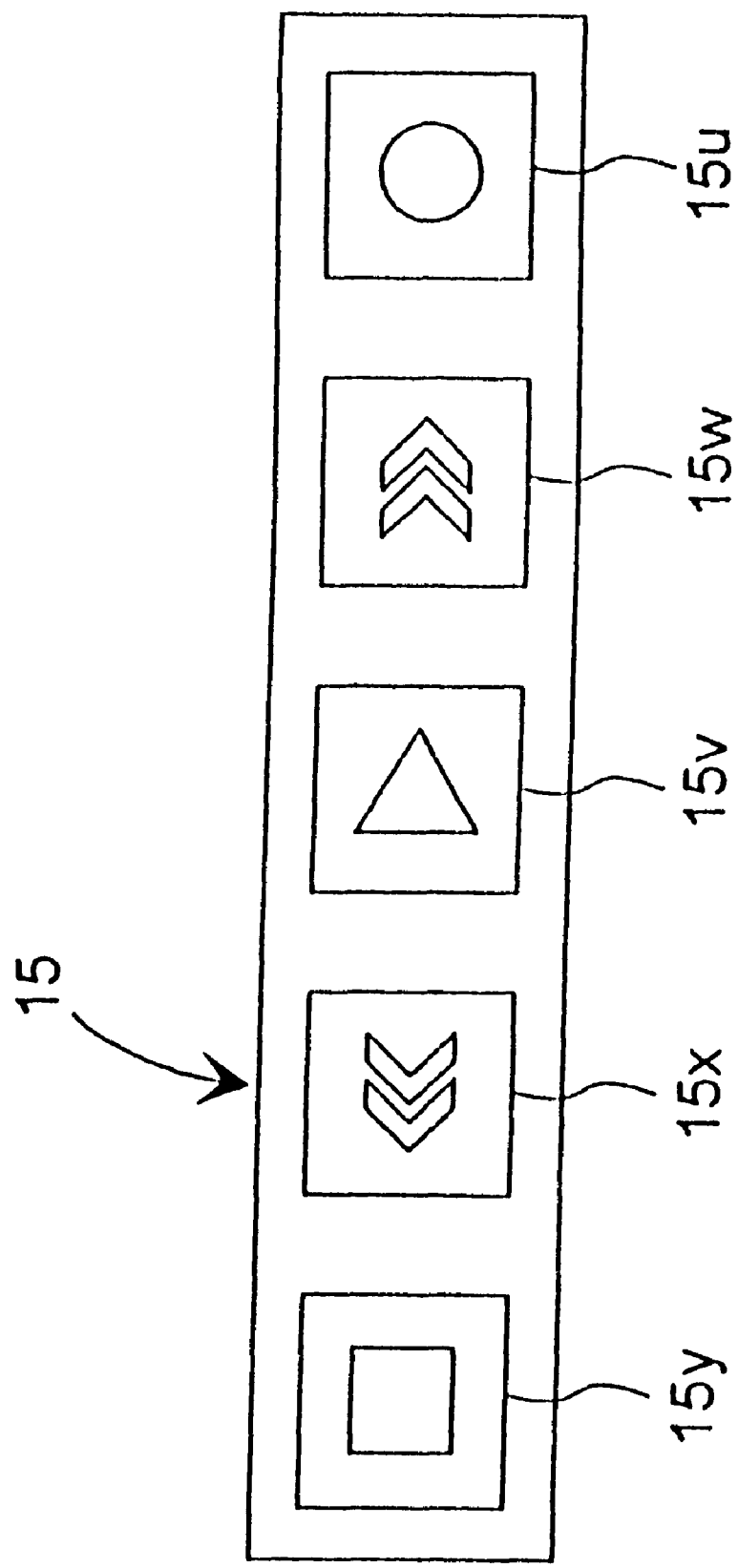
FIG. 3b shows a keypad layout of an auxiliary unit of the wireless communication device of FIG. 3a, and FIG. 4 shows a third wireless communication device, in which the invention can be advantageously applied.

FIG. 3a shows a wireless communication device 1 according to another advantageous embodiment of the invention. The basic unit is also here a mobile station, known as such, and the auxiliary unit 3 is an auxiliary battery 59, with a recorder 56 arranged in connection with the battery 59. The auxiliary unit comprises a keypad 15 (FIG. 3b) including a record key 15u, a play key 15v, winding and rewinding keys 15w, 15x, and a stop key 15y. The recording means is a memory circuit 57 suitable for audio recording, for example a memory circuit recording in the analog form, known as such. The recording time in such memory circuits is usually only a few minutes, but the recording time can be prolonged by chaining several memory circuits.

The auxiliary unit 3 is connected to a battery connector 58 formed in the basic unit 2 e.g. for supplying supply voltages Vcc from the auxiliary battery 59 to the basic unit 2. Further, audio lines 60, 61 are arranged in connection with the battery connector 58. Through the audio output line 60, a microphone signal is entered into the recorder 56 of the auxiliary unit 3 advantageously from a microphone 9 of the basic unit, and in a corresponding manner, the audio signal is led from the recorder 56 through the audio input line 61 to the earpiece 8 of the basic unit.

Further, a locking line 62 is arranged in the battery connector 58. The locking line 62 is coupled to the binary input line I/O11 of the controller 16 in the auxiliary unit. By means of the locking line 62, the controller 10 of the basic unit can control the locking state of the keypad 15 of the auxiliary unit, as will be described below in this description.

In this embodiment, the keys 15$u$, . . . , 15$y$ of the keypad 15 are implemented with key switches K17, . . . , K21, whose first connection line K17$a$, . . . , K21$a$ is coupled to the binary connection lines I/O1, . . . , I/O5 of the controller 16, used as the input lines in this embodiment. The second connection line K17$b$, . . . , K21$b$ of the key switches is coupled to the ground potential. Pull-up resistances MR6, . . . , MR10 are coupled from the binary input lines I/O1, . . . , I/O5 of the controller 16 to the supply voltage Vcc. Thus, in the off position of the key switch, the voltage of the connection line I/O1, . . . , I/O5 of the respective controller is close to the value of the supply voltage Vcc, which in this embodiment corresponds to the logical 1 state. Upon pressing a key 15$u$, . . . , 15$y$, the key switch K17, . . . , K21 is turned on, whereby the corresponding connection line I/O1, . . . , I/O5 of the controller is coupled to the ground potential, i.e. the state of the connection line I/O1, . . . , I/O5 corresponds to the logical 0 state. In the application software of the controller 16 of the auxiliary unit, the number of connection lines is advantageously defined as a separate sub-program, whereby the reading results in a binary digit $b_1b_2b_3b_4b_5$. The bits of the binary digit represent the state of the key switches e.g. in the following way: $b_1$ indicates the logical state (0/1) of the recording switch 15$u$, $b_2$ indicates the logical state of the play switch 15$v$, $b_3$ indicates the logical state of the wind key 15$w$, $b_4$ indicates the logical state of the rewind key 15$x$, and $b_5$ indicates the logical state of the stop key 15$y$.

Advantageously in connection with turning on the wireless communication device, the controller 10 of the basic unit sets the locking line 62 in a state corresponding to the unlocked state of the keypad 15 of the auxiliary unit. In this embodiment, this state is the logical 0 state, and the locked state is the logical 1 state. The voltage value corresponding to the logical 0 state is ca. 0 V, and the logical 1 state is a voltage value close to the supply voltage Vcc.

In this advantageous embodiment, the keyguard operates in the following way. The user turns the keyguard on by using the keypad 6 of the basic unit. Following this, the controller 10 of the basic unit sets the keyguard information in the application software of the basic unit into a state informing that the keyguard is on. Further, the controller 10 of the basic unit changes the state of the locking line 62 to the logical 1 state.

The controller 16 of the auxiliary unit examines the state of the locking line 62 before the controller examines the keypad 15. The state of the locking line 62 can be read in a way similar to the reading of column lines Col1, . . . , Col5 of the keypad described above in this description. The locking line 62 is now in the logical 1 state, i.e. the keypad 15 is locked, whereby the controller 16 does not change the operating state of the recorder even though the user might press keys 15$u$, . . . , 15$y$ of the auxiliary unit. This can be advantageously implemented so that the program part for examining the key pressings is not run in the application software of the controller 16 of the auxiliary unit.

The keyguard can be released by pressing a key sequence for releasing the keyguard with the keypad 6 of the basic unit, as was already disclosed above in connection with the example 1. Following this, the controller 10 of the basic unit changes the keyguard information in the application software into a state that corresponds to the normal operating state of the keypad. Moreover, the controller 10 of the auxiliary unit changes the state of the locking line 62 into the logical 0 state, whereby the controller 16 of the auxiliary unit will detect this change in state when examining the state of the locking line 62 the next time. Because the state of the locking line 62 is now the logical 0 state, i.e. the keypad 15 of the auxiliary unit is not locked, the controller 16 of the auxiliary unit will examine key pressings and control the operation of the recorder 56 on the basis of keys being pressed.

Consequently, the implementation of the locking line 62 presented above is based on the fact that the controller 16 of the auxiliary unit examines the state of the locking line 62 at intervals. The locking line 62 can also be coupled to an interruption line (not shown) of the controller 16 of the auxiliary unit, whereby the change in state (0→1, 1→0) of the locking line 62 will induce an interruption request to the controller 16 of the auxiliary unit. Thus the controller 16 of the auxiliary unit will run the respective interruption program part. This program part contains advantageously a definition for setting the state of the keyguard information to correspond to the state of the locking line 62. Thus, the controller 16 of the auxiliary unit deduces on the basis of the state of the keyguard information whether the keypad 15 is locked or not. In some applications, this use of interruptions will accelerate the operation of the controller 16 of the auxiliary unit, because examining the state of the connection line is in many known microcontrollers slower than examining the random access memory (RAM).

EXAMPLE 3

FIG. 4 shows further a wireless communication device 1 according to a third advantageous embodiment of the invention. The basic unit 2 of the wireless communication device is a mobile station, such as a mobile station according to the reduced wiring diagram shown in FIGS. 1$b$ and 3$a$. The auxiliary unit 3 is a data processor, such as a portable computer (PC) with a keyboard 15 and a display device 18. The basic unit 2 is connected with the auxiliary unit 3 by means of the link module 17 of the auxiliary unit. In this embodiment, the link module 11 of the basic unit is primarily implemented in the application software of the controller 10 of the basic unit. In this advantageous embodiment, the link module 17 of the auxiliary unit is a connection card based on the PCMCIA standard, provided with means (not shown) for transmitting signals between the basic unit 2 and the auxiliary unit 3.

The operation of this embodiment corresponds largely to the operation according to the first advantageous embodiment of the invention. The user can turn the keyguard on e.g. with the keypad 6 of the basic unit, whereby the basic unit 2 can transmit information on the keyguard to the auxiliary unit 3. The keyguard information can be transmitted from the basic unit 2 to the auxiliary unit 3 for example by using message-based data transmission, whereby a message transmitted from the basic unit 2 is received and interpreted in the auxiliary unit 3. As a result, the keyboard of the auxiliary unit is locked. In this embodiment, the basic unit 2 is connected by a transmission cable 63 to the link module 17 of the auxiliary unit for achieving a data transmission connection. Thus, the controller 10 of the basic unit generates a locking message or the like to be transmitted to the link module 17 of the auxiliary unit and further to the auxiliary unit 3. The link module 17 of the auxiliary unit receives the message, and the received message is acknowledged e.g. by an interruption signal to the controller of the auxiliary unit. In this embodiment, the controller of the auxiliary unit is advantageously the central processing unit (CPU) of the data processor (not shown). The controller of the auxiliary unit examines the received message and takes the necessary steps for locking the keyboard 15 of the auxiliary unit. In this context, reference is made to the examples above, disclosing some practical solutions for the keyguard. Releasing the keyguard can be conducted in a corresponding way by sending a message from the basic unit 2 to the auxiliary unit 3. Instead of using a transmission cable 63, the data transmission can take place also in a wireless manner, for example as infrared data transmission.

Further, the invention can be applied in a way that there are several auxiliary units 3, whereby the keyguard information of the basic unit 2 is transmitted to all of the auxiliary units with a separate keypad or keyboard. For example, in the wireless communication device 1 according to the first embodiment of the invention, the auxiliary unit 3 comprises a user interface formed in connection with a wrist band, and the basic unit 2 can also be connected to an auxiliary unit according to the second embodiment of the invention with a battery and a recorder. For transmission of the keyguard information from the basic unit 2 to the auxiliary units 3, it is possible to use solutions described above in this description, whereby a more detailed discussion of this embodiment will not be necessary in this context.

Moreover, in the wireless communication device 1 of the invention, the basic unit 2 can also be e.g. a data processor (PC), whereby the auxiliary unit 3 can be a mobile station or a corresponding data transmission device. Also, data transmission between the basic unit 2 and the auxiliary unit 3 can be implemented by using several different techniques in a wired or wireless manner.

The present invention is not limited solely to the embodiments presented above, but it can be modified within the scope of the appended claims.

What is claimed is:

1. Wireless communication device (1) comprising at least:
    a basic unit (2) with at least one keypad or keyboard (6) for using the wireless communication device (1) and means for locking the keypad (6) of the basic unit, whereby when the keypad (6) of the basic unit is locked, its operation in connection with the wireless communication device (1) is at least partly prevented,
    an auxiliary unit (3) with at least one keypad or keyboard (15), and
    means (11, 17, 58) for connecting the auxiliary unit (3) in a functional connection with the basic unit (2),
    characterized in that the wireless communication device (1) comprises further means (11, 16) for locking the keypad (15) of at least one auxiliary unit arranged in a functional connection with the basic unit (2) simultaneously with locking the keypad (6) of the basic unit, wherein when the keypad (15) of the auxiliary unit is locked, its operation is at least partly prevented.

2. Wireless communication device (1) according to claim 1, comprising further means for unlocking the keypad (6) of the basic unit, characterized in that it comprises further means (11, 16) for unlocking the keypad (15) of the auxiliary unit simultaneously with unlocking the keypad (6) of the basic unit.

3. Wireless communication device (1) according to claim 1, characterized in that it comprises further means (11, 16, 17) for transmitting keyguard information on the keypad (6) of the basic unit to the auxiliary unit (3), and that the auxiliary unit (3) comprises means (16) for setting the state of the keypad (15) of the auxiliary unit to a state indicated by the keyguard information.

4. Wireless communication device (1) according to claim 1, comprising a radio element (4) for a data transmission connection between the wireless communication device (1) and a mobile communication network (NW), characterized in that the radio element (4) is integrated in the basic unit (2).

5. Wireless communication device (1) according to claim 4, characterized in that the auxiliary unit (3) comprises a recorder (56) whose operation is arranged to be controlled by the keypad (15) of the auxiliary unit.

6. Wireless communication device (1) according to claim 4, characterized in that the auxiliary unit (3) comprises further an earpiece (13) and a microphone (14).

7. Wireless communication device (1) according to claim 4, characterized in that the auxiliary unit (3) is a data processor (PC).

8. Wireless communication device (1) according to claim 1, comprising a radio element (4) for a data transmission connection between the wireless communication device (1) and a mobile communication network (NW), characterized in that the radio element (4) is integrated in the auxiliary unit (3).

9. Wireless communication device (1) according to claim 7, characterized in that the basic unit (2) is a data processor (PC).

10. Method for implementing a keyguard in a wireless communication device (1) comprising at least:
    a basic unit (2) with at least one keypad or keyboard (6) for using the wireless communication device (1) and means for locking and unlocking the keypad (6) of the basic unit, whereby when the keypad (6) of the basic unit is locked, its operation in connection with the wireless communication device (1) is at least partly prevented,
    an auxiliary unit (3) with at least one keypad or keyboard (15), and
    means (11, 17, 58) for connecting the auxiliary unit (3) in a functional connection with the basic unit (2),
    characterized in that the keypad (15) of the auxiliary unit is locked in connection with locking the keypad (6) of the basic unit.

11. Method according to claim 10, wherein the wireless communication device (1) comprises further means (10) for unlocking the keypad (6) of the basic unit, characterized in that the keypad (15) of the auxiliary unit is unlocked simultaneously with unlocking the keypad (6) of the basic unit.

12. Method according to claim 10, characterized in that the keypad (15) of the auxiliary unit is unlocked from the keypad (15) of the auxiliary unit, wherein also the keypad (6) of the basic unit is unlocked.

13. Method according to claim 10, characterized in that locking information on the keypad (6) of the basic unit is transmitted to the auxiliary unit (3), whereby in the auxiliary unit (3), the keypad (15) of the auxiliary unit is set in a state indicated by the locking information.

* * * * *